United States Patent
Roy

(10) Patent No.: US 12,218,925 B2
(45) Date of Patent: Feb. 4, 2025

(54) PHYSICALLY DECENTRALIZED AND LOGICALLY CENTRALIZED AUTONOMOUS COMMAND AND CONTROL INCLUDING CYBERSECURITY

(71) Applicant: The Government of the United States, as represented by the Secretary of the Army, Washington, DC (US)

(72) Inventor: Radhika Roy, Howell, NJ (US)

(73) Assignee: The Government of the United States, as represented by the Secretary of the Army, Washington, DC (US)

( * ) Notice: Subject to any disclaimer, the term of this patent is extended or adjusted under 35 U.S.C. 154(b) by 818 days.

(21) Appl. No.: 16/866,585

(22) Filed: May 5, 2020

(65) Prior Publication Data
US 2021/0352060 A1 Nov. 11, 2021

(51) Int. Cl.
*H04L 9/40* (2022.01)
*G05B 19/4155* (2006.01)
*H04L 67/104* (2022.01)

(52) U.S. Cl.
CPC .......... *H04L 63/08* (2013.01); *G05B 19/4155* (2013.01); *H04L 67/104* (2013.01); *G05B 2219/34456* (2013.01)

(58) Field of Classification Search
CPC ... H04L 63/08; H04L 67/104; G05B 19/4155; G05B 2219/34456
See application file for complete search history.

(56) References Cited

U.S. PATENT DOCUMENTS

| | | | | |
|---|---|---|---|---|
| 7,814,535 B1* | 10/2010 | Barile | ................... | H04L 67/104 726/25 |
| 2007/0060056 A1* | 3/2007 | Whitaker | .......... | H04M 1/72415 455/41.2 |
| 2007/0214263 A1* | 9/2007 | Fraisse | .................... | H04L 63/10 709/225 |
| 2008/0307488 A1* | 12/2008 | Hammond, II | ..... | H04L 67/1093 726/1 |
| 2010/0069067 A1* | 3/2010 | Vanderveen | .......... | H04W 12/08 455/435.1 |
| 2010/0250023 A1* | 9/2010 | Gudat | .................. | G05D 1/0278 701/2 |
| 2016/0219061 A1* | 7/2016 | Walton | .................... | H04W 4/80 |
| 2017/0282365 A1* | 10/2017 | Erhart | .................... | G06F 21/74 |
| 2018/0302408 A1* | 10/2018 | Touati | ................... | H04L 9/3234 |

(Continued)

OTHER PUBLICATIONS

Roy, et al., Commanding in Multi-Domain Formations: Vision 2050 Warfighter Cyber-Security, Command and Control Architecture, 2017, 2017 MAD Scientist Conference.

*Primary Examiner* — Jeong S Park
(74) *Attorney, Agent, or Firm* — Ronald Krosky

(57) ABSTRACT

Various embodiments that pertain to network functions are described. A network can be an ad hoc network that function with peer-to-peer communications. The network can be physically decentralized, yet logically centralized. Various functions can be practiced within this network environment. In one example, a provider can provide an authorization to a robot by way of a peer-to-peer communication. The robot can validate the authorization and practice what is authorized in response to the authorization being validated. This authorization can be to perform a function autonomously for a defined length of time.

5 Claims, 11 Drawing Sheets

(56) References Cited

U.S. PATENT DOCUMENTS

2018/0337886 A1* 11/2018 Walter ................ H04L 67/01
2019/0031144 A1* 1/2019 Gat ..................... B60R 25/25
2021/0149369 A1* 5/2021 Subramanian ..... G06Q 10/0639

* cited by examiner

US 12,218,925 B2

1

PHYSICALLY DECENTRALIZED AND LOGICALLY CENTRALIZED AUTONOMOUS COMMAND AND CONTROL INCLUDING CYBERSECURITY

GOVERNMENT INTEREST

The innovation described herein may be manufactured, used, imported, sold, and licensed by or for the Government of the United States of America without the payment of any royalty thereon or therefor.

BACKGROUND

In a client-server communication relationships, multiple dependent entities can communication directly with a centralized server. Further, to communicate client-to-client, communications can be routed via the centralized server. In more complex environments, such as an ad hoc environment (e.g., mobile and/or fixed), where entities can enter and leave independently, such a client-server communication via the centralized structure (e.g., an application server) can be functionally impractical.

SUMMARY

In one embodiment, a system comprises a first network entity of a network and a second network entity of the network. The first network entity and the second network entity can communicate with one another in a peer-to-peer manner. Also, the first network entity and the second network entity are physically decentralized. Additionally, the first network entity and the second network entity can be logically centralized.

In another embodiment, a system comprises a reception component configured to receive, from a provider, an authorization for a robot to perform a function autonomously. The system can also comprise a validation component configured to validate the authorization. The system can additionally comprise a grant component configured to provide a grant to the robot to perform the function autonomously in response to the authorization being validated. The provider and the robot function can in a peer-to-peer environment. In addition, the reception component, the validation component, the grant component, or a combination thereof is configured to be implemented, at least in part, by way of hardware.

In yet another embodiment, a method can be performed, at least in part, by an autonomous robot management apparatus. The method can comprise receiving a request for a robot to perform a function autonomously and evaluating the request to produce an evaluation result. The method can also comprise making a determination if the request is valid based, at least in part, on the evaluation result and providing authorization to the robot to perform the function autonomously in response to the determination being that the request is valid.

BRIEF DESCRIPTION OF THE DRAWINGS

Incorporated herein are drawings that constitute a part of the specification and illustrate embodiments of the detailed description. The detailed description will now be described further with reference to the accompanying drawings as follows.

DETAILED DESCRIPTION

Figure 1:
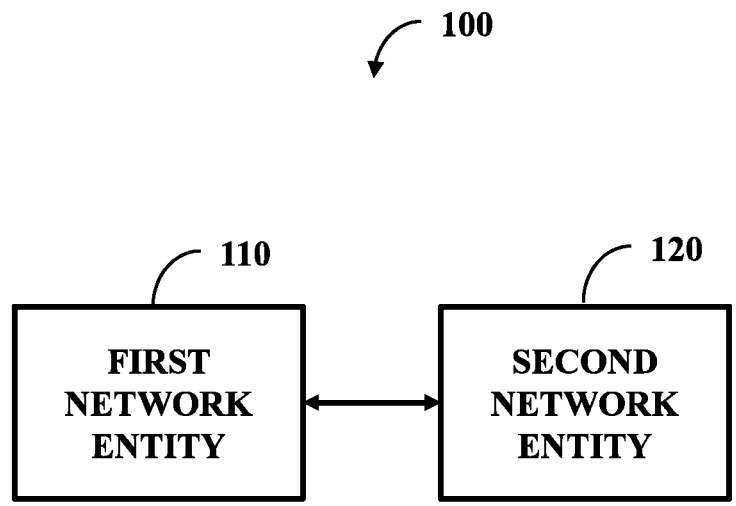
FIG. 1 illustrates one embodiment of a system comprising a first network entity and a second network entity.

In various environments, there can be a complex hierarchy of network entities that form a network. Furthermore, various entities can enter and leave the network independently and the network can function as an ad hoc network. Therefore, communication within the network can be peer-to-peer without communications via the centralized structure (e.g., a centralized application server). The command and control function of such a peer-to-peer network can take place when the network itself is physically decentralized, but remains logically centralized and organized. The cybersecurity, such as authentication and authorization for the peer-to-peer communications including command and control, can be provided by blockchain and other security mechanisms. The client-server mode of communications using star-like communications topology via a centralized entity can be an example of a peer-to-peer communications environment.

The following includes definitions of selected terms employed herein. The definitions include various examples. The examples are not intended to be limiting.

"One embodiment", "an embodiment", "one example", "an example", and so on, indicate that the embodiment(s) or example(s) can include a particular feature, structure, characteristic, property, or element, but that not every embodiment or example necessarily includes that particular feature, structure, characteristic, property, or element. Furthermore, repeated use of the phrase "in one embodiment" may or may not refer to the same embodiment.

"Computer-readable medium", as used herein, refers to a medium that stores signals, instructions and/or data. Examples of a computer-readable medium include, but are not limited to, non-volatile media and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, other optical medium, a Random Access Memory (RAM), a Read-Only Memory (ROM), a memory chip or card, a memory stick, and other media from which a computer, a processor or other electronic device can read. In one embodiment, the computer-readable medium is a non-transitory computer-readable medium.

"Component", as used herein, includes but is not limited to hardware, firmware, software stored on a computer-readable medium or in execution on a machine, and/or combinations of each to perform a function(s) or an action(s), and/or to cause a function or action from another component, method, and/or system. Component may include a software controlled microprocessor, a discrete component, an analog circuit, a digital circuit, a programmed logic device, a memory device containing instructions, and so on. Where multiple components are described, it may be possible to incorporate the multiple components into one physical component or conversely, where a single component is described, it may be possible to distribute that single component between multiple components.

"Software", as used herein, includes but is not limited to, one or more executable instructions stored on a computer-readable medium that cause a computer, processor, or other electronic device to perform functions, actions and/or behave in a desired manner. The instructions may be embodied in various forms including routines, algorithms, modules, methods, threads, and/or programs, including separate applications or code from dynamically linked libraries.

FIG. 1 illustrates one embodiment of a system 100 comprising a first network entity 110 and a second network entity 120. The network entities 110 and 120 can be part of a network. While the network entities can be physically decentralized, they can still be logically centralized. Further, they can communicate with one another in a peer-to-peer manner (e.g., strictly peer-to-peer or hybrid peer-to-peer/client-server). This can allow the network to function independent of a client-server relationship.

The system 100 can function with 'secured' command and control in multi-domain integrated with the hybrid client-server (C/S) and peer-to-peer (P2P) network that can allow humans and autonomous robots to operate to meet the mission objectives, such as when the human-body itself is networked. Autonomous robots can be kept under human control (e.g., human-in-the-loop control) for decision making. Flexible command and control networking architecture can be practiced that decouples the physically centralized ties to the hierarchical physical locations. This makes systems more reliable and more robust, and allows for various constructs such as swarm attacks by robots as well as a not centralized network operation center.

Figure 2:
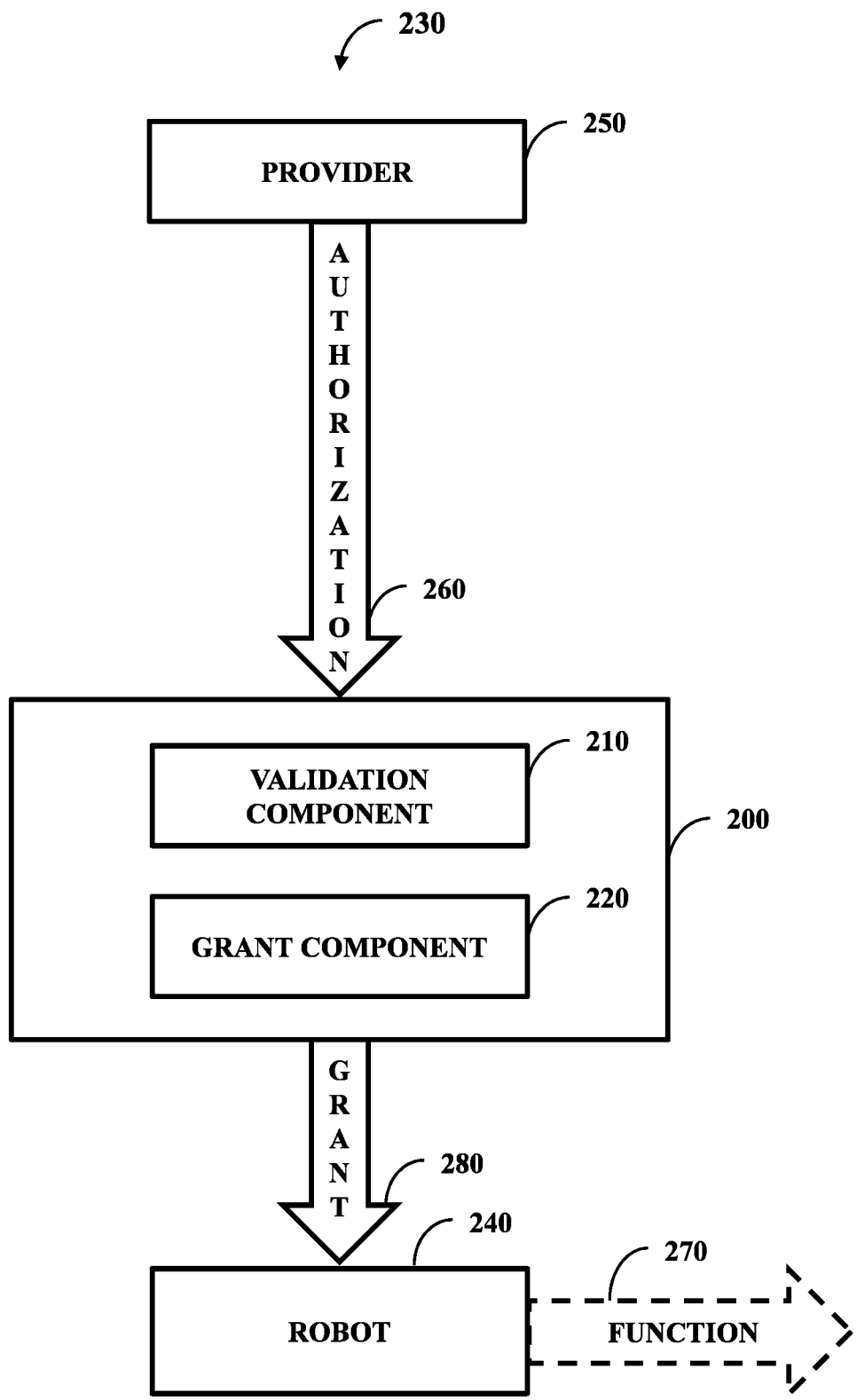
FIG. 2 illustrates one embodiment of a system comprising a validation component and a grant component.

FIG. 2 illustrates one embodiment of a system 200 comprising a validation component 210 and a grant component 220. The system 200 can operate in an environment 230 that includes a robot 240 (e.g., the second network entity 120 of FIG. 1). A provider 250 (e.g., the first network entity 110 of FIG. 1) can provide an authorization 260 for the robot 240 to perform a function 270. The validation component 210 can be configured to validate the authorization 260 for the robot to perform the function 270 autonomously. In response to the authorization 260 being validated, the grant component 220 can be configured to provide a grant 280 to the robot 240 to perform the function 270 autonomously.

In one example, the provider 250 can be a computer on a network and the robot 240 can be a fire protection android that is also be part of the network. During a fire emergency, a user on the computer can provide an authorization 260 for the android to automatically put out a fire, a fire authorization, when a condition is met, such when the android detects a fire (e.g., through employment of optical and temperature sensors). The validation component 210 can check to make sure that the fire authorization is valid by analyzing the fire authorization and metadata (e.g., source of the first authorization and time fire authorization is sent). If the validation component 210 is not able to validate the fire authorization in response to the check, then the validation component 210 can disregard the fire authorization, send an error message, etc.

If the validation component 210 is able to validate the fire authorization, then an indication of this validation can be provided for the grant component 220. The grant component 220 can then produce the grant 280 that grants the android to perform the function 270 of attempting to put out the fire when such a fire is detected. In one example, the grant 280 from the grant component 220 is until the person at the computer rescinds the authorization 260 and in turn the validation component 210 and grant component 220 can rescind the grant 280.

The validation component 210 and the grant component 220 can be implemented in different manners. In one embodiment, the validation component 210 and/or the grant component 220 are resident upon an entity separate and distinct from the robot 240 for which the grant 180 is provided. Examples of this can include a central network terminal or on a separate robot. In another embodiment, the validation component 210 and/or the grant component 220 are resident upon the robot 240. In one embodiment, the provider 250 is resident upon the same entity as the validation component 210 and/or grant component 220 (e.g., the three are resident upon the robot 240).

Figure 3A:
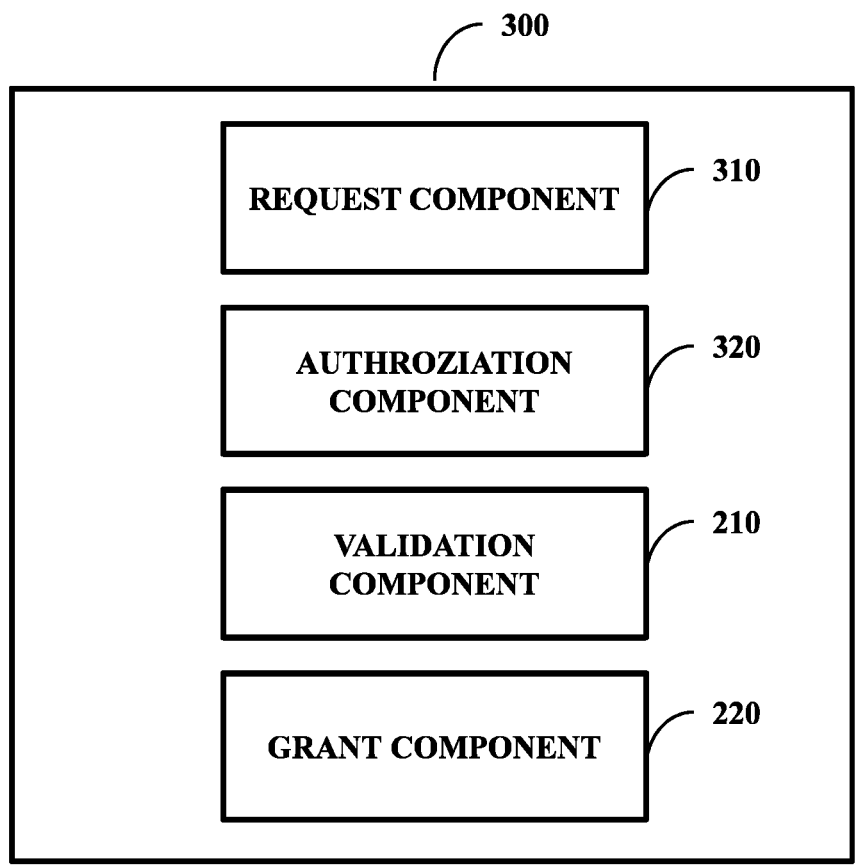
FIG. 3A illustrates one embodiment of a system comprising a request component, an authorization component, the validation component, and the grant component.
Figure 3B:
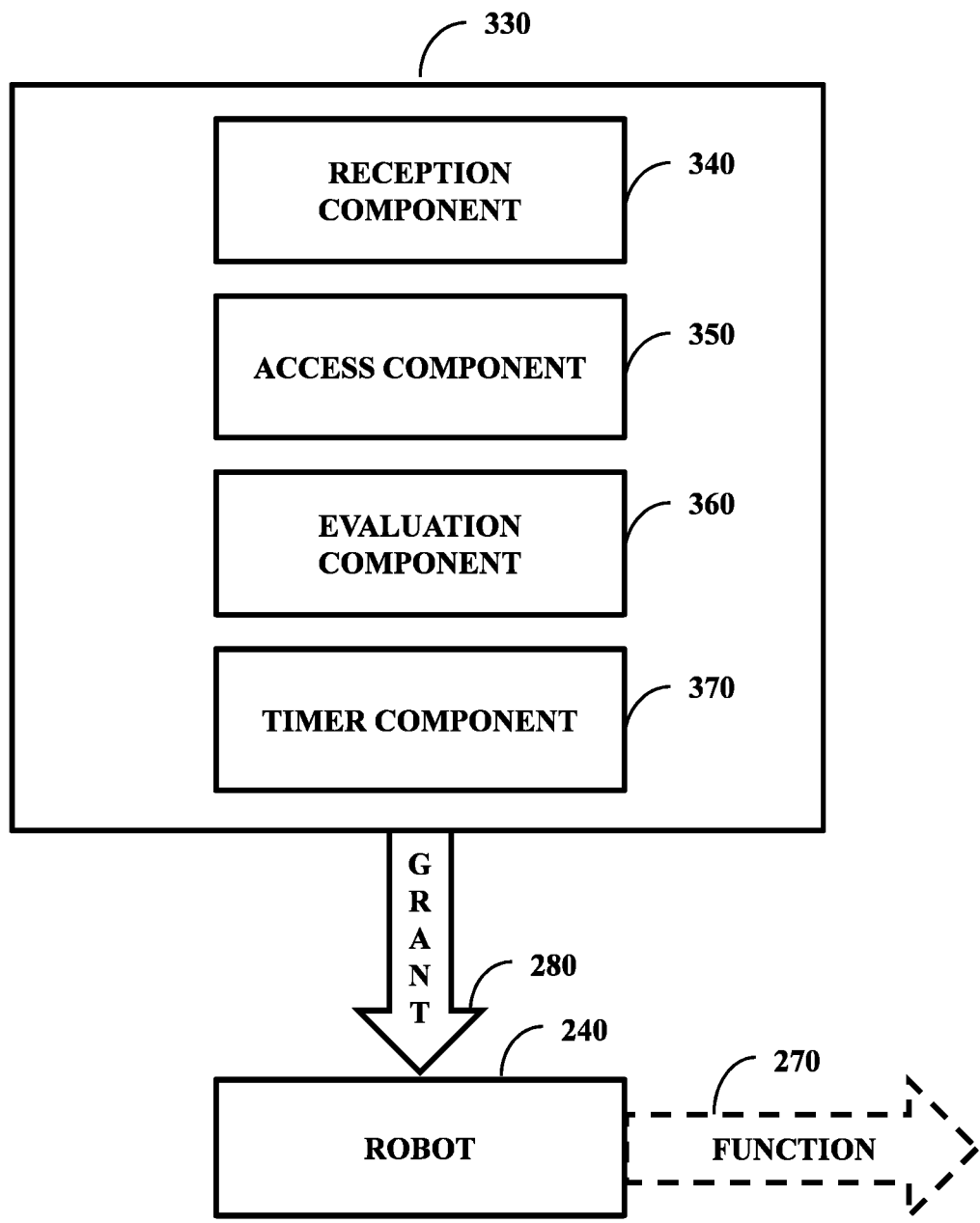
FIG. 3B illustrates one embodiment of a component set comprising a reception component, an access component, an evaluation component, and a timer component.

FIG. 3A illustrates one embodiment of a system 300 comprising a request component 310, an authorization component 320, the validation component 210, and the grant component 220. The request component 310 and the authorization component 320 can function as the provider 250 of FIG. 2. FIG. 3B illustrates one embodiment of a component set 330 comprising a reception component 340, an access component 350, an evaluation component 360, and a timer component 370. The components of the component set 330 can function along with (e.g., complementary to or part of) the validation component 210 and/or the grant component 220. In one example, the reception component 340 functions as part of the validation component 210 and therefore is part of the system 200 of FIG. 2.

The request component 310 can produce a request that the function 270. The request can be specific (e.g., that 'android X' perform the function 270) or generic (e.g., an android of a swarm perform the function 270). The request can be supplied, for example, by a person (e.g., a foreman at a computer terminal) or another robot (e.g., a robot of an equal hierarchical level to the robot 270, a robot of a higher authority level to the robot 270, or a robot of a lower authority level to the robot 270).

The reception component 340 can receive the request. The access component 350 can be configured to provide access by the authentication component 320 to the request. This can include the access component 350 sending the request to the authentication component 320 or the authentication component 320 employing the access component 350 to access the request that is stored in a computer-readable medium after reception.

The evaluation component 360 can be configured to perform an evaluation that pertains to the request. Various forms of evaluation can occur to determine that the request is appropriate and in turn the authorization 260 of FIG. 2 and the grant 280 should be produced. If the evaluation of the request is not successful, then the authorization 260 of FIG. 2 is not produced. The evaluation component 360 can also evaluate the authorization 260 of FIG. 2 and if that evaluation is not successful, then the grant 280 is not produced.

In one example, the fire protection android can be deployed in an emergency situation. This emergency situation can be stressful for firefighters, administrators, and other emergency personnel. The request can be from a fire captain for the fire protection android to autonomously spray water on a fire when identified. Biometric data associated with the fire captain can be linked with the request. Examples of biometric data can include fingerprint information of the fire captain and heart rate information of the fire captain. The request can be evaluated by the evaluation component 360 by evaluating the biometric data.

In an example, the evaluation component 360 identifies the heart rate and compares the heart rate against a threshold. If the heart rate meets the threshold (e.g., does not exceed the threshold), then the request can be considered valid. A message can be sent to the authorization component on the result of this evaluation and the authorization component 320 can use the message to authenticate a request for the robot 240 to perform the function 270. In response to the request being authenticated, the authorization component 320 can generate the authorization 260 of FIG. 2. Similarly, the validation component 210 can evaluate the heart rate in order for the grant 280 to be produced.

Conversely, if the heart rate does not meet the threshold (e.g., exceeds the threshold), then the request can be considered invalid. Various actions can occur with an invalid request, such as producing a notice to the provider 250 of FIG. 2, producing a notice to a separate entity, or disregarding the request. Other examples of biometric data can include voice volume when the request is an audible request as well as retinal scan data of a requestor.

In one example, the evaluation can be based on a health state associated with the biometric data and in turn the evaluation result. For example, consumption of alcohol, congestion indication a flu, increased body temperature, or other physical signs can indicate a person is not sound to give autonomous functionality to the robot 240. If a person requesting does not meet minimum health standard (physically or mentally), then the request can be denied.

Additionally, the evaluation component 360 can evaluate non-biometric data and a result of this evaluation can be used in in producing the authorization 260 of FIG. 2 and/or the grant 280. Example non-biometric data can include the request being submitted with a password key, contextual indicators associated with the request (e.g., the requested function appears to violate rules of engagement), as well as request metadata (e.g., time of day information). As an example, if a request is provided at a time of day that is an outlier to when the request is normally submitted, then the request can be denied. Conversely, the evaluation can be more complex. For example, an off-time request from a Lieutenant can be rejected, but the same request from a Captain can be validated due to the superior rank.

Biometric and non-biometric data can be used together for providing the authorization. Evaluation can occur on both who is giving the request (e.g., by way of a unique user passcode) and their health state (e.g., heart rate). The evaluation can be based, at least in part, on an identification associated with the biometric data result and a health state associated with the biometric data result. The authentication component 320 can function to not authenticate the request unless the evaluation result indicates a proper identification and the health state meeting a minimum standard (e.g., the requestor is well enough to make the request). If there is proper identification and the health state meets minimum standards, then the grant 280 can be generated and supplied to the robot 240.

The grant can be for a limited time. This time can be indicated in the request or can be determined by logic of the system 300. The timer component 370 can determine the time and embed the grant with an indication of this time. As an example, the time can be in nanoseconds (e.g., in a combat environment) or weeks and longer (e.g., in a wildfire environment in a remote location).

The timer component 370 can run a timer from a start time to an end time. The grant 280 can be for a timeframe between the start time and the end time. Upon the end time being reached the robot 240 is no longer granted to perform the function 170 autonomously.

The timer component 370 can function as part of the robot 240 as well as another entity. When functioning as part of the robot 240, the robot can self-shut off the ability to perform the function 270. When functioning as part of another entity, such as the provider 250 of FIG. 2 and/or the system 200 of FIG. 2, the entity can monitor time and send a disauthorization to stop the function 270.

Figure 4:
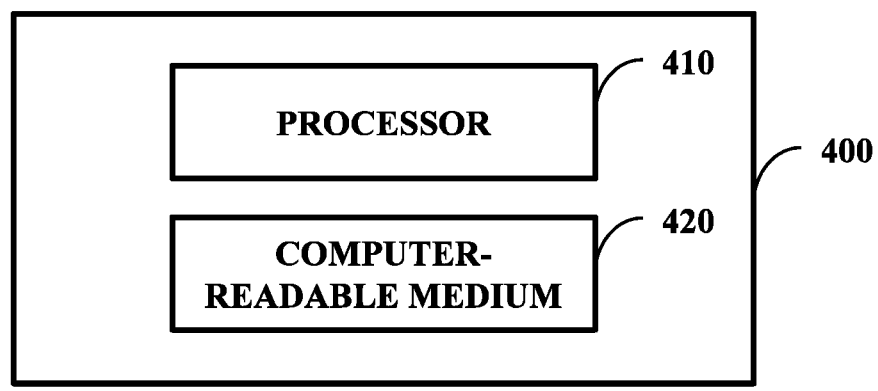
FIG. 4 illustrates one embodiment of a system comprising a processor and a computer-readable medium.

FIG. 4 illustrates one embodiment of a system 400 comprising a processor 410 and a computer-readable medium 420 (e.g., non-transitory computer-readable medium). The processor 410 and the computer-readable medium 420 can function as part of an autonomous robot management apparatus and/or a robot configured to perform a function autonomously (e.g., the robot 240 of FIG. 2). In one embodiment, the computer-readable medium 420 is communicatively coupled to the processor 410 and stores a command set executable by the processor 410 to facilitate operation of at least one component disclosed herein (e.g., the validation component 210 of FIG. 2 and/or a causation component). In one embodiment, at least one component disclosed herein (e.g., an authentication component and/or a generation component) can be implemented, at least in part, by way of non-software, such as implemented as hardware by way of the system 400. In one embodiment, the computer-readable medium 420 is configured to store processor-executable instructions that when executed by the processor 410, cause the processor 410 to perform at least part of a method disclosed herein (e.g., at least part of one of the methods 500-800 discussed below).

Figure 5:
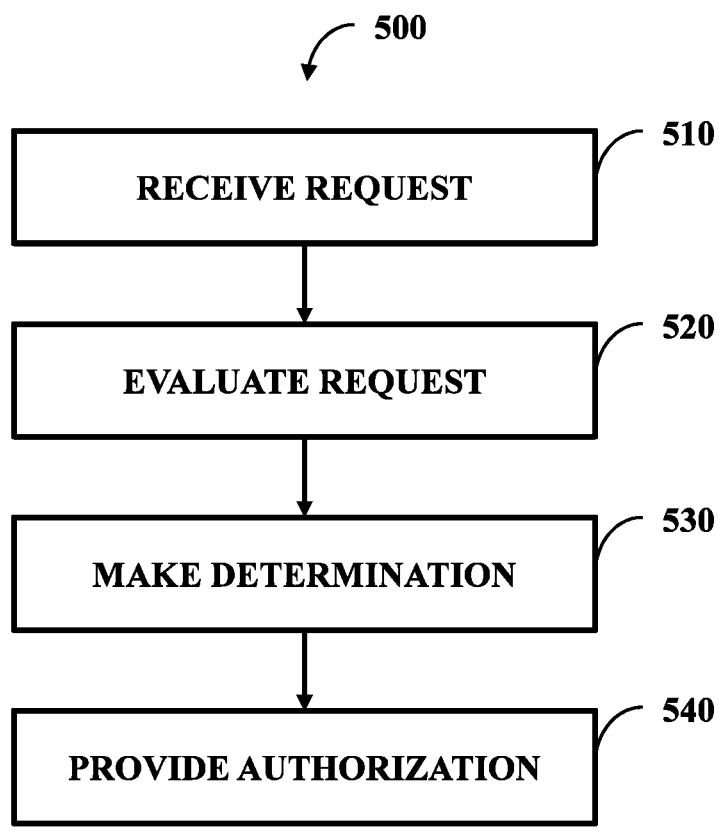
FIG. 5 illustrates one embodiment of a method comprising four actions.

FIG. 5 illustrates one embodiment of a method 500 comprising four actions 510-540. The actions 510-540 can be performed by an autonomous robot management apparatus that is resident upon the robot 240 of FIG. 2 or separate from the robot 240 of FIG. 2. At 510, a request can be received for the robot 240 of FIG. 2 to perform the function 270 of FIG. 2 autonomously. At 520, the request can be evaluated to produce an evaluation result, such as evaluated based on an identification of a person that sends the request and/or a health state of the person that sends the request. At 530, a determination can be made if the request is valid based, at least in part, on the evaluation result. Providing authorization to the robot 240 of FIG. 2 to perform the function autonomously can occur at 540 in response to the determination being that the request is valid. In one embodiment, the authorization is not provided to the robot 240 of FIG. 2 unless the evaluation result indicates that the identification is proper and that the health state is proper.

In one embodiment, the requestor is another robot. The robot 240 of FIG. 2 can be a first robot. The request can be received (e.g., at the apparatus) from a second robot separate and distinct from the first robot. The second robot can be of a higher authority level than the first robot, an equal authority level to the first robot, or a lesser authority level than the first robot. The second robot can autonomously generate the request, such as through analysis of sensor data from a sensor set of the second robot.

Figure 6:
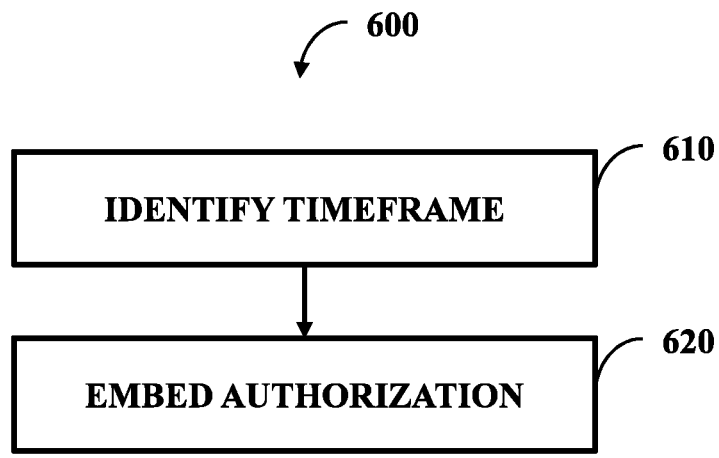
FIG. 6 illustrates one embodiment of a method comprising two actions.

FIG. 6 illustrates one embodiment of a method 600 comprising two actions 610-620. At 610, a timeframe for the authorization 260 of FIG. 2 can be identified. At 620, the authorization 260 of FIG. 2 can be embedded with the timeframe such that the authorization 260 of FIG. 2, and in turn the grant 280 of FIG. 2, is provided exclusively for the timeframe. The actions 610 and/or 620 can be considered part of the action 540 of FIG. 5.

Figure 7:
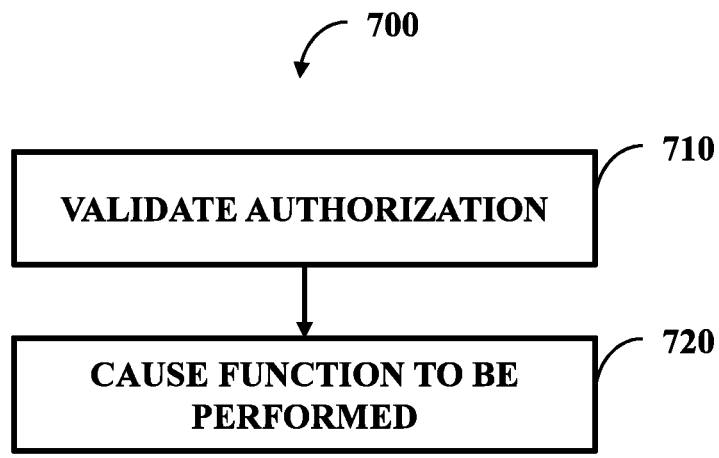
FIG. 7 illustrates one embodiment of a method comprising two actions.

FIG. 7 illustrates one embodiment of a method 700 comprising two actions 710-720. The actions 710 and 720 can be performed by the robot 240 of FIG. 2. At 710, validating the authorization 260 of FIG. 2 to perform a function 270 of FIG. 2 autonomously can be performed (e.g., action 710 is performed by the validation component 210 of FIG. 2 when part of the robot 240 of FIG. 2). As discussed above, the validation can be health state based, identification based, or other. At 720, there can be causing the function 270 of FIG. 2 by the robot 240 of FIG. 2 in response to the authorization 260 of FIG. 2 being validated (e.g., action 720 is performed by the causation component discussed with regard to FIG. 4). In one embodiment, action 720 can include the robot 240 of FIG. 2 performing the function 270 of FIG. 2 itself.

Figure 8:
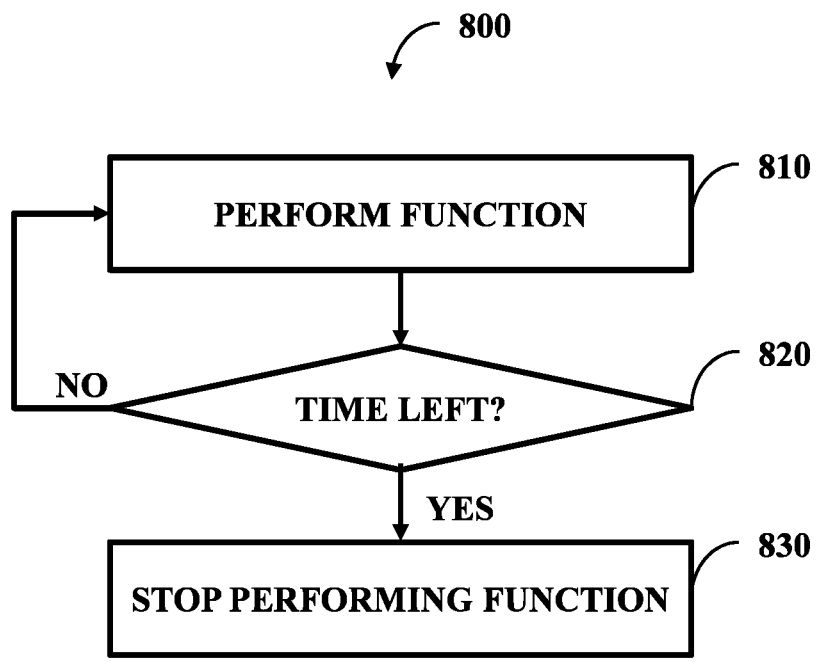
FIG. 8 illustrates one embodiment of a method comprising four actions.

FIG. 8 illustrates one embodiment of a method 800 comprising four actions 810-830. The function 270 of FIG. 2 can be performed by the robot 240 of FIG. 2 at 810. At 820, the robot 240 of FIG. 2 can identify a timeframe for the function 270 of FIG. 2 to be performed (e.g. a timeframe of the authorization 260 of FIG. 2) and track the time of the function being performed. If there is time left, then the function 270 of FIG. 2 can continue to be performed at 810. However, at 820 there can be an identification of when the time reaches an end of the timeframe. Upon this occurring, the function 270 of FIG. 2 can no longer be caused to be performed at 830.

In one example, the method 800 can function in conjunction with a clock. When the causation component causes the robot 240 of FIG. 2 to autonomously perform the function 270 of FIG. 2, the clock can start. The robot 240 of FIG. 2 can compare the time of the clock with a time limit provided by the authorization 260 of FIG. 2. When the time limit is reached, the robot 240 of FIG. 2 can stop performing the function 270 of FIG. 2.

While the methods disclosed herein are shown and described as a series of blocks, it is to be appreciated by one of ordinary skill in the art that the methods are not restricted by the order of the blocks, as some blocks can take place in different orders.

Figure 9A:
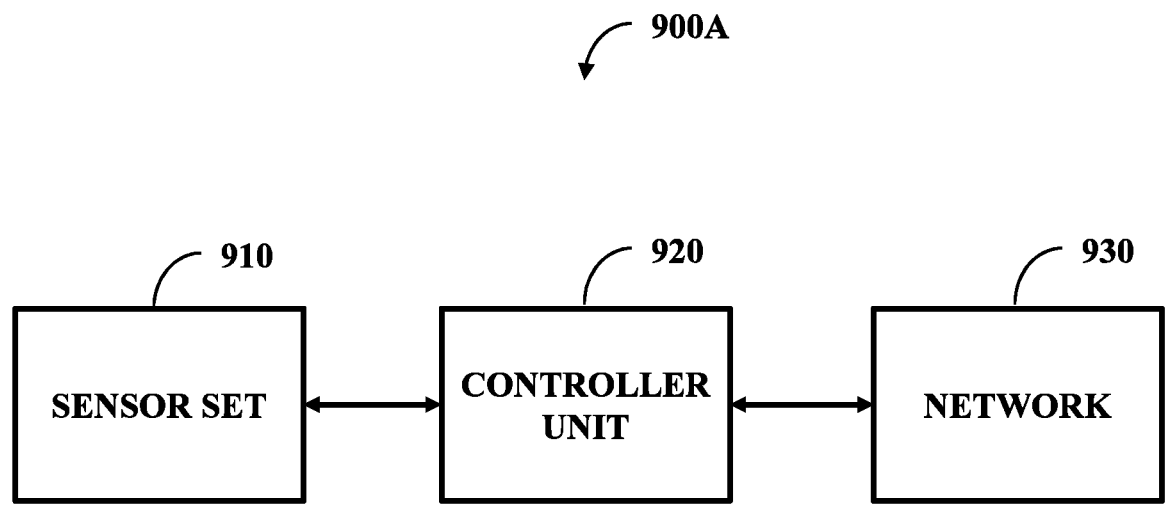
FIG. 9A illustrates one embodiment of an environment comprising a sensor set, a controller unit, and a network.

FIG. 9A illustrates one embodiment of an environment 900A comprising a sensor set 910, a controller unit 920, and a network 930. The sensor set 910 can be one or more sensors associated with a person. In one example, the heart rate used to determine the health state above can be ascertained by the sensor set 910. The data of the sensor set 910 as well as other data (e.g., a voice command) can be accessed by the controller unit 920. This controller unit 920 can process, aggregate, store, and communicate data. The data can be communicated to the network 930. The robot 240 of FIG. 2 can be part of the network 930 and the provider 250 of FIG. 2 can comprise the sensor unit 910 and/or the controller unit 920. Additionally, in one example, the sensor set 910 and the controller unit 920 can form the first network entity 110 of FIG. 1 and the network 930 can function as the second network entity 120 of FIG. 1.

Figure 9B:
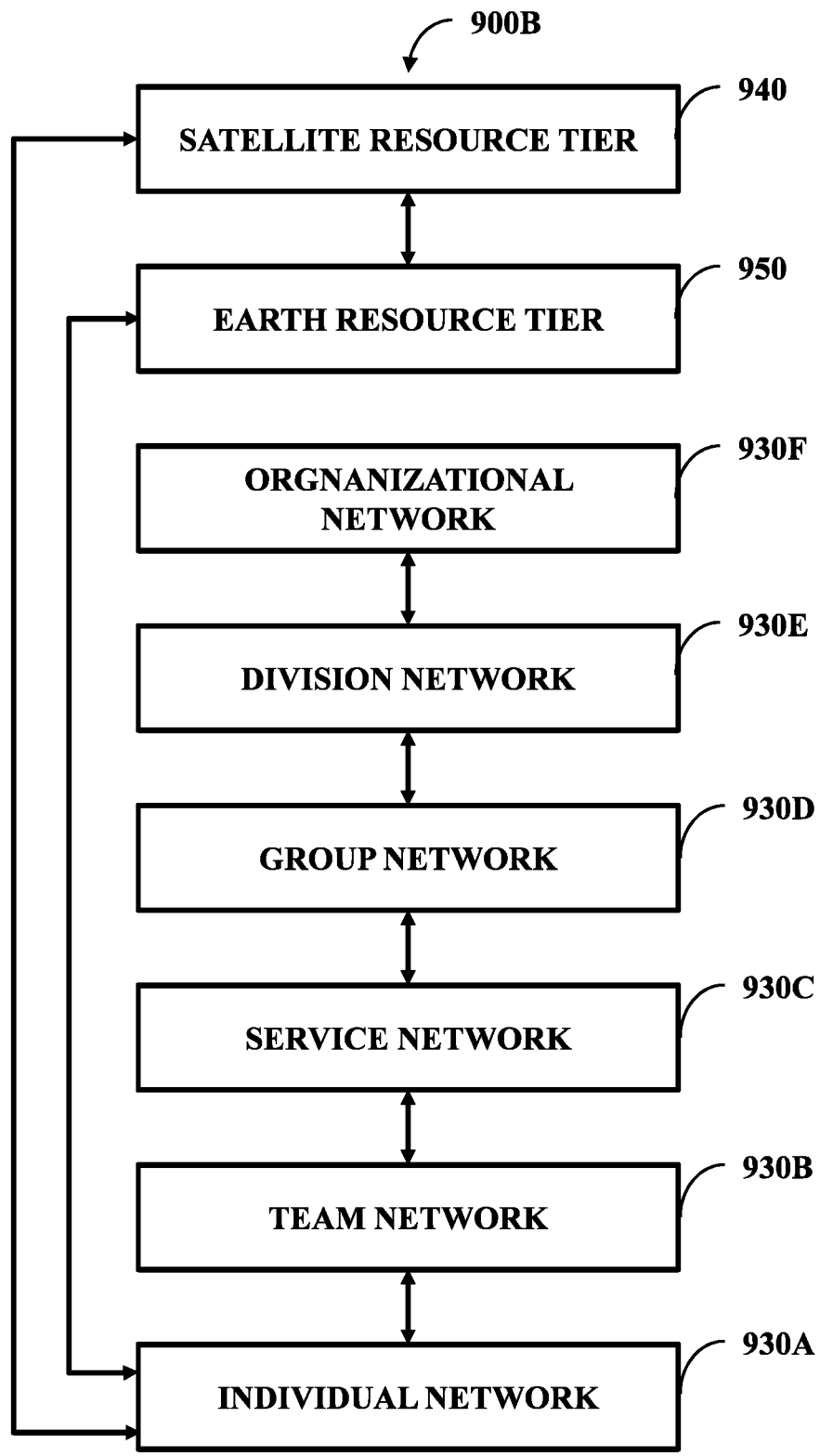
FIG. 9B illustrates one embodiment of a communication hierarchy with networks and resource tiers.

FIG. 9B illustrates one embodiment of a communication hierarchy 900B with networks 930A-930F and resource tiers 940-950. Consider the following example of major business. The individual network 930A can be an employee's devices, such as computer and cellular telephone. The team network 930B can be individual networks of a team, such as a payroll team. The service network 930C can be can be team networks of a service, such as an employee benefits service. The group network 930D can be service networks of a group, such as a human resources group. The division network 930E can be group networks of a division, such as the human capital division. The organizational network 930F can be division networks that form the company. The company can employ different resources, such as a satellite resource tier 940 (e.g., information communicated by way of satellites) and an earth resource tier 950 (e.g., information directly communicated by a source).

In one embodiment, the sensor set 910 and/or the controller unit 920 can operate as the individual network 930A. The network 930 can be any one of or more than one of the networks 930A-F. It is to be appreciated by one of ordinary skill in the art that the network 930 can have the six illustrated levels, as well as more or less. The first robot and second robot can be of the same level (e.g., both group network 930D robots) or different levels (e.g., one a service network 930C robot and one a team network 930B robot, the service network 930C robot being of a higher authority level than the team network 930B robot)

In a military context, the individual network 930A can be a soldier radio network, the team network 930B can be a squad radio network, the service network 930C can be a platoon radio network, the group network 930D can be a company network, the division network 930E can be brigade network, and the organizational network 930F can be a backbone network (e.g., network of a military division). The different network levels can have access to satellite communications from the tier 940 as well as unmanned aerial vehicle communications from the tier 950.

Aspects disclosed herein can be practiced to account for a variety of emerging innovative technologies that are shaping the future of information communications for warfighter networks and other networks. The multi-domain formations can include multiple tiers. In one example, ten different tiers for cyber command and control can be employed: three tiers in space (GEO satellites, LEO/MEO satellites, and nano/pico-satellites—the satellite tier 940), one tier in air (UAVs—the earth tier 950), and six hierarchical "logical" terrestrial tiers (company, regiment, platoon, squad, team leader, and rifleman—the networks 930A-F). Similar to the air tier, a configuration can occur such that none of these terrestrial tiers of warfighter networks are rigidly tied to the geographical locations. The hierarchy of terrestrial tiers can dynamically be changed at will to meet mission objectives.

Individual communications network nodes in terrestrial and air tier can be a part of mobile ad hoc networks, can act as an independent peer, and can join, leave, rejoin, and/or swarm at will to meet mission objectives. The peer-to-peer communications architecture can be used because each autonomous entity can to communicate as an equal independent peer while moving freely without depending on any fixed infrastructures.

These satellites, UAVs, and vehicles can have artificial intelligence-based autonomous robotic technologies for communications. Each human soldier's body (by way of the sensor set 910) can be connected over the cyber network for both password-less continuous authentication and health condition monitoring. Army operational units can have both humans and autonomous robots at different levels. Even in the rifleman tier (individual network 930A), autonomous robots can be at the forefront of the battlefield to fight enemies while humans can be further pushed out from the decision-loop.

Cyber-adversaries can be augmented with autonomous robotics that have enough power to launch cyber-attacks with unprecedented complexity, frequency, and speed. Each cyber-entity in each tier can be equipped with an autonomous cyber-defense robot for prevention, detection, and repair of the cyber-systems automatically without any human intervention.

Furthermore, command and control with multi-domain formations can have a peer-to-peer communication architecture to meet the battlefields' mission objectives. The cloud computing and fog computing utilizing a client-server-based centralized communications architecture can co-exist serving as backend servers for high-end computation-intensive applications. Even these backend services can be offered in a cellular-like communications architecture. Independent mobile peer nodes, which are communicating in peer-to-peer (P2P) fashion among themselves in mobile ad hoc networks (MANETs), can use those computation-intensive services from the backend servers occasionally on-demand from time-to-time as appropriate as they have limited processing power.

Cyber-threats can become omnipresent with the unprecedented advancement in innovative technologies coupled with artificial intelligence (AI) along with billions/trillions of interconnected internet-of-things (IOTs) where each human body can also be connected using nano-biosensors including augmented humans. The net impact of super-intelligent information technologies fueled with robotics, smart munitions, ubiquitous sensing, and extreme networking can be large, along with the potentially massive impact of cyber warfare. Cyber-threats can be launched even by a couple of hackers or rough-individuals equipped with low-cost powerful technologies powered with artificial intelligence capabilities, not to speak of dedicated terror groups, enemy nation-states, and powerful adversaries.

A fundament change can be that each individual body will be cyber-connected using a body area network (BAN), the individual network 830A, equipped with nano-technology-based ultra-thin sensors powered by ultra-small phone-like devices. This is illustrated in the environment 900A. The cyber-network can become synonymous with connected people's life itself. This can transform to the warfighter, such that the warfighter can communicate with a cyber-system autonomously without human intervention.

Nano-technology-based smart biosensors (e.g. patch, digital-tattoo) of a BAN, harvest energy from near-field communication (NFC) signals such as tiny smartphones, sunlight, or by other manners. In one embodiment, these biosensors can be waterproof and breathable, and can be worn for a week or so, before the normal shedding of skin cells begins to force the thin substrate to peel from the skin.

The physiological signals like Electrocardiogram (ECG) that is generated by biosensors of a BAN can used to authenticate a user continuously where no password is needed to enter as is the case in today's networks. It is a revolution in security for authentication especially for warfighters where the dynamic movements of soldiers in constant combat environments do not warrant the use of passwords. A unique cryptographic key can be designed from a user's ECG signal allowing the encryption of information.

The Internet-of-Things (IoT) are tiny small devices that can be physical or logical, but those devices can usually be connected over the Internet. Physical things exist in the physical world and are capable of being sensed, actuated and connected. Examples of physical things include the biosensors, smart sensors, surrounding environment, industrial robots, goods and electrical equipment, and wearable technology. Virtual things exist in the information world and are capable of being stored, processed and accessed. Examples of virtual things include multimedia content and application software. The advancement of nano-technologies has created very tiny small devices such as biosensors that have great intelligent and can communicate over the Internet.

Devices like IoT and others can employ machine-to-machine (M2M) or device-to-device (D2D) communication such that the information of communications architecture can primarily be peer-to-peer (P2P), a fundamental deviation of the classical client-server (C/S) communications between devices. In one embodiment, there can be some selective mix of P2P and C/S communications, but in the age of IoT, P2P communications can be predominant.

A goal of artificial intelligence (AI) can been to mimic human intelligence as far as it can. In practice AI employs reasoning, knowledge, planning, learning, communications using natural language processing, perception, and ability to move and manipulate objects. The scope of the AI is huge in complexity and sophistication. In short, neural network and machine learning are the two major areas that have played the important role for AI development. Ultimately, AI has driven the development of autonomous robotic technologies. Neural networks are trained, for example, to run the control system of robotics based on command. Machine learning provides the ability of a program to learn automatically when exposed to new environments and can adjust itself accordingly, for example, the robot 240 of FIG. 2 can have this kind of learning capability.

AI-based intelligent autonomous robotics can be ubiquitous in the battlespace including applications in warfighter communications networks. Robotics can be mostly networked, however, and can be in different categories depending on the applications in meeting the mission objectives. For example some robots can be autonomous robotic soldiers, ground MANET nodes, air MANET nodes in unmanned air vehicles (UAVs), Intelligence, Surveillance, Target Acquisition, and Reconnaissance (ISR) robotics sensors, battlefield robots, robotic vehicles, bio-inspired robots, cognitive robots, cyber-defense robots, and other categories.

Computer vision, machine learning, natural language processing, speech recognition, and other functions are usually performed by humans. Like humans, the artificial intelligence-based autonomous robots can be used to understand the human behavior and can predict the actions that a human will take. These sorts of technologies are termed as cognitive technologies and the robot 240 of FIG. 2 can employ cognitive technologies.

Sensors can be equipped with an AI-based autonomous robotics capability and termed as the smart sensor. The smart sensors can be built using smart IoT devices equipped with robotics capability. The traffic payload generated by each smart sensor can be anywhere from a few bytes to large, high bandwidth intensive real-time continuous videos. When hundreds/thousands/millions of smart sensors start sending data, intensive processing power can be used for fusion of this huge amount of traffic load to produce the actionable information either for humans or for the robot 240 of FIG. 2.

The swarm capability in battlespace is an important aspect in modern warfare for dealing with new emerging threats like asymmetrical warfare. Autonomous robots, like that of team or group works by human soldiers, can be used for swarming. Swarms can be self-organized and/or collaborative actions of robots with varying degree of freedom that employ a P2P communications architecture without fixed infrastructures as special formations of MANETs. Joining, leaving, and rejoining, swarms in battlespace can be widely used in MANETs as a capability.

There can also be a combination of mixed human-robot teams in the battlespace. The human team members collaborating with robots can be enhanced in a variety of ways by implanting cognitive technologies in human bodies. These members can also have access to sensing and cognitive powers with enhanced physical capabilities as well.

Autonomous robotics can be the center for cyber-communications in each tier and can be able to move, joint, rejoin, and swarm autonomously as independent peers. This can be achieved with peer-to-peer (P2P) communication architecture, such as a pure P2P architecture as well as a hybrid architecture of both C/S and P2P. Some example MANETs are the vehicle-to-vehicle (V2V), unmanned aerial vehicle (UAV), and robot-to-robot (R2R) network, nano/micro-satellite-to-satellite (Nano/Micro-S2S), low-earth-orbit/medium-earth-orbit satellite-to-satellite (LEO/MEO-S2S), and geostationary orbit satellite-to-satellite (GEO-S2S) networks. BANs comprising biosensors, large numbers of smart IoT devices, M2M/D2V communications, artificial intelligence, robotics, cognitive technologies, smart sensors, swarms in battlespace, augmented humans, and P2P communications architecture can be part of warfighting networks.

Man-machine interfaces (MMIs) can be employed for command and control (C2). In one example, such an interface can be used with the provider 250 of FIG. 2. This interface can facilitate automatic computing processes that remove the human-in-the-loop in the analysis process. Smart richer human-machine interfaces can interpret the results to human users. Artificial intelligence algorithms employed by the robot 240 of FIG. 2 or other entities can include machine learning and natural language processing can prevent, detect, and repair the cyber-systems against sophisticated cyber-attacks (e.g. polymorphic malware and persistent threats) using an automated process even without human interventions.

Cyber-defense can function such that each node (e.g., terminal, server, and network-switch/router) of the interconnected network can be also be autonomous, acting as the independent entity or equal peer for cyber-defense. As a consequence, the communication architecture between each cyber-entity can be P2P without creating additional traffic for cyber-defense over the network. The P2P architecture can enable each entity to execute its processes for cyber-defense autonomously without waiting for information from other entities. There can be some communications between different network entities for cooperative actions against cyber-attacks informing one another, however, this communication can be independent of each individual entity's cyber-defense computing for defending itself. Additionally, the cyber-defense communications protocol design can conform to the P2P architecture. Furthermore, the command and control communications architecture for the cyber-defense can also be P2P.

Each node can defend itself as an independent peer. The autonomous AI-based robotics can be employed for cyber-defense. As a result, the P2P security protocols can be deployed given the fact that the P2P-Voice-over-IP (VoIP) can use P2P-Session Initiation Protocol (P2P-SIP) standardized in the Internet Engineering Task Force (IETF) standard organization where security protocols align with the P2P communications architecture.

A MANET communications architecture can be structured such that an individual mobile node acts as an independent peer with no functional or operational dependency with other peers. That is, the MANET network behaves as a P2P network. Additionally, the MANET can be such that churns of the mobile nodes can be very high which demands that the look-up of the neighboring nodes and re-establishment of the communication network topology, and routing schemes must be very fast. Otherwise, the network topology can be portioned/fragmented/disconnected. Individual MANET node can manage its own security for cyber-attack prevention, detection, and repair the system without depending to any other peers. The MANET can function without a fixed hierarchy that is tied to the physical network topology and/or function without centralized network management centers as it is seen in the centralized C/S architecture because each node can do its own management. A MANET can be set up on-the-fly as there is no need for any elaborate test as seen in the classical C/S networking. Node failures can be replaced by other peer nodes as each peer node has the same capability and thereby enhancing reliability. The MANET can function without fixed infrastructures and in at least some embodiments, for example—if a network is partitioned, there may not be any end-to-end connection between the source and the destination path for a period of time causing intermittent connectivity.

What is claimed is:

1. A system, comprising:
a reception component configured to receive, from a provider, an authorization for a robot to perform a function autonomously;
a validation component configured to validate the authorization;
a grant component configured to provide a grant to the robot to perform the function autonomously in response to the authorization being validated,
where the provider and the robot function in a peer-to-peer environment and
where the reception component, the validation component, the grant component, or a combination thereof is configured to be implemented, at least in part, by way of hardware;
an authentication component configured to authenticate a request for the robot to perform the function;
a generation component configured to generate the authorization in response to the request being authenticated;
an access component configured to provide access by the authentication component to the request, where the request is supplied by a person; and
an evaluation component configured to perform an evaluation of a biometric data result associated with the person to produce an evaluation result, where the biometric data result is linked with the request and where the authentication component is configured to employ the evaluation result in authentication of the request, where the evaluation is based, at least in part, on an identification associated with the biometric data result and where the authentication component does not authenticate the request unless the evaluation result indicates a proper identification, and where the evaluation is based, at least in part, on a health state associated with the biometric data result and where the authentication component does not authenticate the request unless the evaluation result indicates the health state meeting a minimum standard.

2. The system of claim 1, comprising:

a timer component configured to run a timer from a start time to an end time, where the grant is for a timeframe between the start time and the end time, where upon the end time being reached the robot is no longer granted to perform the function autonomously.

3. The system of claim 1, where the validation component is resident upon the robot and where the grant component is resident upon the robot.

4. A method performed, at least in part, by an autonomous robot management apparatus, the method comprising:

receiving a request for a robot to perform a function autonomously;

evaluating the request to produce an evaluation result;

making a determination if the request is valid based, at least in part, on the evaluation result; and providing authorization to the robot to perform the function autonomously in response to the determination being that the request is valid, where a sender of the request is a person, where the request evaluation is based, at least in part, on an identification of the person, where the request evaluation is based, at least in part, on a health state of the person, and where the authorization is not provided unless the evaluation result indicates that the identification is proper and that the health state is proper.

5. The method of claim 4, comprising:

identifying a timeframe for the authorization; and embedding the authorization with the timeframe, where the authorization is provided exclusively for the timeframe.

* * * * *